(12) United States Patent
Geary et al.

(10) Patent No.: US 8,772,207 B2
(45) Date of Patent: Jul. 8, 2014

(54) SPHERICAL PELLETS CONTAINING COMMON CLAY PARTICULATE MATERIAL USEFUL AS A PROPPANT IN HYDRAULIC FRACTURING OF OIL AND GAS WELLS

(71) Applicant: Brownwood Clay Holdings, LLC, Austin, TX (US)

(72) Inventors: Bryan Dell Geary, Missoula, MT (US); David Glenn Hall, Houston, TX (US); Carlton Frazier Sorrell, Missoula, MT (US); Gary J. Davis, Austin, TX (US); Richard F. Watkins, Austin, TX (US)

(73) Assignee: Brownwood Clay Holdings, LLC, Austin, TX (US)

( * ) Notice: Subject to any disclaimer, the term of this patent is extended or adjusted under 35 U.S.C. 154(b) by 0 days.

(21) Appl. No.: 13/924,049

(22) Filed: Jun. 21, 2013

(65) Prior Publication Data

US 2013/0345100 A1    Dec. 26, 2013

Related U.S. Application Data

(60) Provisional application No. 61/664,591, filed on Jun. 26, 2012.

(51) Int. Cl.
*C09K 8/74* (2006.01)
*C09K 8/60* (2006.01)
*E21B 43/00* (2006.01)
*E21B 43/26* (2006.01)

(52) U.S. Cl.
USPC ........... 507/269; 507/207; 507/212; 507/214; 507/230; 166/308.1

(58) Field of Classification Search
USPC ........ 507/269, 207, 212, 214, 230; 166/308.1
See application file for complete search history.

(56) References Cited

U.S. PATENT DOCUMENTS

| | | | |
|---|---|---|---|
| 2,621,131 A * | 12/1952 | Lathe | 501/122 |
| 4,427,068 A | 1/1984 | Fitzgibbon | |
| 4,522,731 A | 6/1985 | Lunghofer | |
| 4,658,899 A | 4/1987 | Fitzgibbon | |
| 4,680,230 A | 7/1987 | Gibb et al. | |
| 5,087,375 A * | 2/1992 | Weinwurm | 210/688 |
| 2008/0070774 A1 | 3/2008 | Shmotev | |

FOREIGN PATENT DOCUMENTS

RU    2196889 C1 *   1/2003

OTHER PUBLICATIONS

English translation of RU2196889C1, 2003.*
International Search Report and Written Opinion of the International Searching Authority for PCT/US2013/0479047.

* cited by examiner

*Primary Examiner* — Aiqun Li
(74) *Attorney, Agent, or Firm* — Hulsey Calhoun, PC; William N. Hulsey, III; Jacob S. Mattis

(57) ABSTRACT

A ceramic propping agent, in the form of a spherical pellet, and containing common mineral particulate. The desired propping agent is defined as a particulate ceramic made from raw materials which may be comprised of about: 10%-90% parts by weight of a naturally occurring mineral particulate, 30%-70% parts by weight aluminosilicate network modifier, 0.25-20% parts by weight strength enhancer, and at least one part, typically less than 10% by weight, binder. For use in oil and/or natural gas wells as a hydraulic fracturing proppant.

14 Claims, 16 Drawing Sheets

Table 1

| Material Composition and Chemistry of Particulate Ceramic Examples | Example I | Example II | Example III | Example IV |
|---|---|---|---|---|
| Dry weight % of BCH | 38% | 56% | 80% | 16% |
| Dry weight % Aluminosilicate Network Modifier(s) | 57% | 40% | 20% | 75% |
| Dry weight % of Strength Enhancer(s) | 5% | 4% | 0% | 9% |
| Al2O3 | 55-65% | 35-45% | 20-35% | 60-70% |
| SiO2 | 30-40% | 40-50% | 60-65% | 25-35% |
| TiO2 | .5-1% | .5-1% | 1-2% | .5-1% |
| Fe2O3 | 2-3% | 3-4% | 5-7% | 1-2% |

Figure 8

| Table 2 – Mesh Range of -40+70 for Each Example | Example I | Example II | Example III | Example IV |
|---|---|---|---|---|
| Characteristics of Particulate Ceramic Examples | | | | |
| % Fines at 5,000 PSI | 0.2 | 0.1 | 0.7 | 0.1 |
| % Fines at 7,500 PSI | 0.9 | 0.3 | 2.0 | 0.3 |
| % Fines at 10,000 PSI | 1.8 | 1.4 | 3.9 | 1.2 |
| % Fines at 12,500 PSI | 3.5 | 3.4 | | 3.0 |
| % Fines at 15,000 PSI | 5.4 | 6.7 | | 4.2 |
| Specific Gravity | 2.75 | 2.67 | 2.55 | 2.85 |
| Fired Bulk Density (lbs/ft3) | 94.00 | 92.00 | 90.00 | 96.00 |

Figure 9

| Table 3 – Mesh Range of -30+50 for Each Example ||||||
|---|---|---|---|---|
| Characteristics of Particulate Ceramic Examples | Example I | Example II | Example III | Example IV |
| % Fines at 5,000 PSI | 0.7 | 0.2 | | 0.1 |
| % Fines at 7,500 PSI | 1.5 | 1.4 | | 0.3 |
| % Fines at 10,000 PSI | 2.1 | 3.7 | | 1.2 |
| % Fines at 12,500 PSI | 4.1 | 5.4 | | 3.5 |
| % Fines at 15,000 PSI | 7.1 | | | 5.4 |
| Specific Gravity | 2.75 | 2.67 | 2.55 | 2.85 |
| Fired Bulk Density (lbs/ft3) | 94.00 | 92.00 | 90.00 | 96.00 |

Figure 10

| Table 4 – Mesh Range of -20+40 for Each Example | Example I | Example II | Example III | Example IV |
|---|---|---|---|---|
| Characteristics of Particulate Ceramic Examples | | | | |
| % Fines at 5,000 PSI | 0.3 | 0.5 | | 0.3 |
| % Fines at 7,500 PSI | 2.3 | 2.1 | | 1.3 |
| % Fines at 10,000 PSI | 4.5 | 4.9 | | 3.2 |
| % Fines at 12,500 PSI | 6.3 | | | 4.5 |
| % Fines at 15,000 PSI | | | | 7.4 |
| Specific Gravity | 2.75 | 2.67 | 2.55 | 2.85 |
| Fired Bulk Density (lbs/ft3) | 94.00 | 92.00 | 90.00 | 96.00 |

Figure 11

Table 5

| Chemical Composition of Mineral Particulate Aluminosilicate Network Modifiers and Strength Enhancers | Common Clay | Alumina | Kaolin | Meta Kaolin | Nepheline 1 | Nepheline 2 | Bauxitic Clay 1 | Bauxite 1 | Volcanic Ash | Fly Ash | Perlite |
|---|---|---|---|---|---|---|---|---|---|---|---|
| Al2O3 | 18.0% | 99.5% | 38.4% | 44.0% | 23.6% | 19.0% | 55.0% | 80.0% | 13.6% | 19.25% | 13.6% |
| SiO2 | 65.0% | 0.0% | 45.9% | 51.0% | 60.2% | 60.3% | 38.0% | 12.0% | 76.4% | 64.75% | 76.4% |
| TiO2 | 0.8% | 0.0% | 2.6% | 2.9% | 0.1% | 1.1% | 2.5% | 1.0% | 0.1% | 0% | 0.08% |
| Fe2O3 | 8.0% | 0.0% | 0.6% | 0.8% | 0.1% | 4.7% | 2.5% | 6.0% | 1.2% | 1.60% | 1.21% |
| CaO | 1.3% | 0.0% | 0.0% | 0.0% | 0.4% | 1.3% | 0.1% | 0.1% | 0.8% | 5.25% | 0.89% |
| MgO | 2.0% | 0.0% | 0.3% | 0.3% | 0.1% | 1.2% | 0.1% | 0.1% | 0.1% | 0.75% | 0.13% |
| K2O | 3.5% | 0.0% | 0.1% | 0.1% | 4.8% | 5.3% | 0.1% | 0.1% | 4.6% | 2.25% | 4.77% |
| Na2O | 0.7% | 0.0% | 0.1% | 0.1% | 10.5% | 6.2% | 0.1% | 0.1% | 3.2% | 3.40% | 3.50% |
| Mn | 0.0% | 0.0% | 0.0% | 0.0% | 0.0% | 0.0% | 0.0% | 0.0% | 0.0% | 0.0% | 0.03% |
| Specific Gravity | 2.40 | 3.80 | 2.60 | 2.60 | 2.65 | 2.63 | 2.70 | 2.90 | 2.50 | 1.80 | 2.34 |

Figure 12

Table 6: Example II in -20+40 Mesh Size

| Conductivity and Permeability at 2lb/sq ft | | | | | | | |
|---|---|---|---|---|---|---|---|
| Hrs at Closure & Temperature | Closure (psi) | Temp (°F) | Conductivity (md-ft) | Width (in) | Permeability (Darcy) | | |
| -14 | 1000 | 75 | 8081 | 0.236 | 411 | Median diameter of particulate ceramic sample of .580 mm with distribution of: | |
| -2 | 1000 | 250 | 6735 | 0.235 | 344 | | |
| | | | | | | Mesh Screen Size | % of texted sample retained on mesh screen |
| 0 | 2000 | 250 | 6620 | 0.232 | 342 | 20 | 0.0% |
| 10 | 2000 | 250 | 6058 | 0.230 | 316 | 25 | 10.2% |
| 20 | 2000 | 250 | 5928 | 0.230 | 309 | 30 | 41.9% |
| 30 | 2000 | 250 | 5852 | 0.230 | 305 | 35 | 21.2% |
| 40 | 2000 | 250 | 5798 | 0.229 | 304 | 40 | 23.3% |
| 50 | 2000 | 250 | 5756 | 0.229 | 302 | 45 | 3.3% |
| 0 | 4000 | 250 | 5349 | 0.226 | 284 | % in size as -20+40 | 96.60% |
| 10 | 4000 | 250 | 5123 | 0.225 | 274 | | |
| 20 | 4000 | 250 | 5070 | 0.225 | 270 | | |
| 30 | 4000 | 250 | 5040 | 0.225 | 269 | | |
| 40 | 4000 | 250 | 5018 | 0.225 | 267 | | |
| 50 | 4000 | 250 | 5001 | 0.225 | 266 | | |
| 0 | 6000 | 250 | 4579 | 0.221 | 249 | | |
| 10 | 6000 | 250 | 4150 | 0.219 | 227 | | |
| 20 | 6000 | 250 | 4051 | 0.218 | 223 | | |
| 30 | 6000 | 250 | 3993 | 0.218 | 220 | | |
| 40 | 6000 | 250 | 3951 | 0.218 | 218 | | |
| 50 | 6000 | 250 | 3919 | 0.218 | 216 | | |
| 0 | 8000 | 250 | 2677 | 0.213 | 151 | | |
| 10 | 8000 | 250 | 2428 | 0.211 | 138 | | |
| 20 | 8000 | 250 | 2370 | 0.210 | 136 | | |
| 30 | 8000 | 250 | 2336 | 0.209 | 134 | | |
| 40 | 8000 | 250 | 2312 | 0.209 | 133 | | |
| 50 | 8000 | 250 | 2294 | 0.209 | 132 | | |
| 0 | 10000 | 250 | 1334 | 0.197 | 82 | | |
| 10 | 10000 | 250 | 1248 | 0.195 | 77 | | |
| 20 | 10000 | 250 | 1228 | 0.192 | 77 | | |
| 30 | 10000 | 250 | 1216 | 0.191 | 76 | | |
| 40 | 10000 | 250 | 1208 | 0.191 | 76 | | |
| 50 | 10000 | 250 | 1202 | 0.191 | 76 | | |
| 0 | 12000 | 250 | 1020 | 0.185 | 66 | | |
| 10 | 12000 | 250 | 964 | 0.183 | 63 | | |
| 20 | 12000 | 250 | 952 | 0.182 | 63 | | |
| 30 | 12000 | 250 | 944 | 0.182 | 62 | | |
| 40 | 12000 | 250 | 939 | 0.181 | 62 | | |
| 50 | 12000 | 250 | 935 | 0.181 | 62 | | |

Figure 13

Table 7: Example II in -30+50 Mesh Size

| Conductivity and Permeability at 2lb/square foot | | | | | | | | |
|---|---|---|---|---|---|---|---|---|
| Hrs at Closure & Temperature | Closure (psi) | Temp (°F) | Conductivity (md-ft) | Width (in) | Permeability (Darcy) | | Median diameter of particulate ceramic sample of 461 mm with distribution of: | |
| -14 | 1000 | 75 | 4581 | 0.237 | 232 | | | |
| -2 | 1000 | 250 | 4184 | 0.236 | 213 | | | |
| | | | | | | Mesh Screen | Screen Size | % of tested sample retained on mesh screen |
| 0 | 2000 | 250 | 3962 | 0.234 | 203 | | 20 | 0.0% |
| 10 | 2000 | 250 | 3886 | 0.233 | 200 | | 25 | 0.0% |
| 20 | 2000 | 250 | 3869 | 0.232 | 200 | | 30 | 0.5% |
| 30 | 2000 | 250 | 3858 | 0.232 | 200 | | 35 | 33.4% |
| 40 | 2000 | 250 | 3851 | 0.232 | 199 | | 40 | 40.7% |
| 50 | 2000 | 250 | 3845 | 0.232 | 199 | | 45 | 15.9% |
| 0 | 4000 | 250 | 3445 | 0.230 | 180 | | 50 | 9.4% |
| 10 | 4000 | 250 | 3406 | 0.229 | 178 | | % in size as -30+50 | 99.400% |
| 20 | 4000 | 250 | 3397 | 0.228 | 179 | | | |
| 30 | 4000 | 250 | 3392 | 0.227 | 179 | | | |
| 40 | 4000 | 250 | 3388 | 0.227 | 179 | | | |
| 50 | 4000 | 250 | 3385 | 0.227 | 179 | | | |
| 0 | 6000 | 250 | 3119 | 0.224 | 167 | | | |
| 10 | 6000 | 250 | 2888 | 0.223 | 156 | | | |
| 20 | 6000 | 250 | 2834 | 0.222 | 154 | | | |
| 30 | 6000 | 250 | 2803 | 0.222 | 152 | | | |
| 40 | 6000 | 250 | 2781 | 0.222 | 151 | | | |
| 50 | 6000 | 250 | 2763 | 0.222 | 149 | | | |
| 0 | 8000 | 250 | 2072 | 0.218 | 114 | | | |
| 10 | 8000 | 250 | 1969 | 0.216 | 110 | | | |
| 20 | 8000 | 250 | 1945 | 0.215 | 109 | | | |
| 30 | 8000 | 250 | 1931 | 0.214 | 108 | | | |
| 40 | 8000 | 250 | 1921 | 0.214 | 108 | | | |
| 50 | 8000 | 250 | 1913 | 0.214 | 107 | | | |
| 0 | 10000 | 250 | 1048 | 0.202 | 62 | | | |
| 10 | 10000 | 250 | 981 | 0.200 | 59 | | | |
| 20 | 10000 | 250 | 965 | 0.199 | 58 | | | |
| 30 | 10000 | 250 | 956 | 0.199 | 58 | | | |
| 40 | 10000 | 250 | 950 | 0.199 | 57 | | | |
| 50 | 10000 | 250 | 945 | 0.199 | 57 | | | |
| 0 | 12000 | 250 | 780 | 0.193 | 49 | | | |
| 10 | 12000 | 250 | 706 | 0.190 | 45 | | | |
| 20 | 12000 | 250 | 689 | 0.189 | 44 | | | |
| 30 | 12000 | 250 | 679 | 0.189 | 43 | | | |
| 40 | 12000 | 250 | 671 | 0.188 | 43 | | | |
| 50 | 12000 | 250 | 666 | 0.188 | 43 | | | |

Figure 14

Table 8: Example II in -40+70 Mesh Size

Conductivity and Permeability at 2lb/square foot

| Hrs at Closure & Temperature | Closure (psi) | Temp (°F) | Conductivity (md-ft) | Width (in) | Permeability (Darcy) | | | |
|---|---|---|---|---|---|---|---|---|
| -14 | 1000 | 75 | 2569 | 0.235 | 131 | Median diameter of particulate ceramic sample of .369 mm with distribution of: | | |
| -2 | 1000 | 250 | 2344 | 0.233 | 121 | | | |
| | | | | | | Mesh Screen Size | Mesh Screen Size | % of tested sample retained on mesh screen |
| 0 | 2000 | 250 | 2235 | 0.231 | 116 | | 30 | 0.0% |
| 10 | 2000 | 250 | 2165 | 0.229 | 113 | | 35 | 0.0% |
| 20 | 2000 | 250 | 2148 | 0.229 | 113 | | 40 | 1.5% |
| 30 | 2000 | 250 | 2139 | 0.229 | 112 | | 45 | 68.5% |
| 40 | 2000 | 250 | 2132 | 0.228 | 112 | | 50 | 29.8% |
| 50 | 2000 | 250 | 2127 | 0.228 | 112 | | 60 | 0.3% |
| 0 | 4000 | 250 | 1954 | 0.226 | 104 | | 70 | 0.0% |
| 10 | 4000 | 250 | 1915 | 0.225 | 102 | % in size as -40+70 | | 98.5% |
| 20 | 4000 | 250 | 1906 | 0.225 | 102 | | | |
| 30 | 4000 | 250 | 1901 | 0.224 | 102 | | | |
| 40 | 4000 | 250 | 1897 | 0.224 | 102 | | | |
| 50 | 4000 | 250 | 1894 | 0.224 | 101 | | | |
| 0 | 6000 | 250 | 1750 | 0.221 | 95 | | | |
| 10 | 6000 | 250 | 1660 | 0.220 | 90 | | | |
| 20 | 6000 | 250 | 1639 | 0.220 | 89 | | | |
| 30 | 6000 | 250 | 1627 | 0.219 | 89 | | | |
| 40 | 6000 | 250 | 1618 | 0.219 | 89 | | | |
| 50 | 6000 | 250 | 1612 | 0.219 | 88 | | | |
| 0 | 8000 | 250 | 1433 | 0.217 | 79 | | | |
| 10 | 8000 | 250 | 1354 | 0.215 | 76 | | | |
| 20 | 8000 | 250 | 1335 | 0.214 | 75 | | | |
| 30 | 8000 | 250 | 1325 | 0.214 | 74 | | | |
| 40 | 8000 | 250 | 1317 | 0.214 | 74 | | | |
| 50 | 8000 | 250 | 1311 | 0.214 | 74 | | | |
| 0 | 10000 | 250 | 1042 | 0.207 | 60 | | | |
| 10 | 10000 | 250 | 976 | 0.206 | 57 | | | |
| 20 | 10000 | 250 | 961 | 0.205 | 56 | | | |
| 30 | 10000 | 250 | 952 | 0.204 | 56 | | | |
| 40 | 10000 | 250 | 946 | 0.204 | 56 | | | |
| 50 | 10000 | 250 | 941 | 0.204 | 55 | | | |
| 0 | 12000 | 250 | 804 | 0.199 | 49 | | | |
| 10 | 12000 | 250 | 732 | 0.195 | 45 | | | |
| 20 | 12000 | 250 | 715 | 0.195 | 44 | | | |
| 30 | 12000 | 250 | 705 | 0.194 | 44 | | | |
| 40 | 12000 | 250 | 698 | 0.194 | 43 | | | |
| 50 | 12000 | 250 | 693 | 0.194 | 43 | | | |

Figure 15

Table 9: Example III in -40+80 Mesh Size

Conductivity and Permeability at 2 lb/square foot

| Hrs at Closure & Temperature | Closure (psi) | Temp (°F) | Conductivity (md-ft) | Width (in) | Permeability (Darcy) | Median diameter of particulate ceramic sample of .314 mm with distribution of: | |
|---|---|---|---|---|---|---|---|
| | | | | | | Mesh Screen Size | % of texted sample retained on mesh screen |
| -14 | 1000 | 75 | 1824 | 0.234 | 93 | 30 | 0.0% |
| -2 | 1000 | 250 | 1539 | 0.233 | 79 | 35 | 0.0% |
| 0 | 2000 | 250 | 1514 | 0.230 | 79 | 40 | 1.1% |
| 10 | 2000 | 250 | 1468 | 0.228 | 77 | 45 | 28.9% |
| 20 | 2000 | 250 | 1458 | 0.228 | 77 | 50 | 36.6% |
| 30 | 2000 | 250 | 1452 | 0.228 | 77 | 60 | 18.1% |
| 40 | 2000 | 250 | 1447 | 0.228 | 76 | 70 | 11.8% |
| 50 | 2000 | 250 | 1444 | 0.228 | 76 | 80 | 3.5% |
| 0 | 4000 | 250 | 1316 | 0.226 | 70 | % in size as -40+80 | 95.4% |
| 10 | 4000 | 250 | 1267 | 0.225 | 68 | | |
| 20 | 4000 | 250 | 1256 | 0.225 | 67 | | |
| 30 | 4000 | 250 | 1249 | 0.224 | 67 | | |
| 40 | 4000 | 250 | 1244 | 0.224 | 67 | | |
| 50 | 4000 | 250 | 1241 | 0.224 | 67 | | |
| 0 | 6000 | 250 | 1055 | 0.222 | 57 | | |
| 10 | 6000 | 250 | 1007 | 0.221 | 55 | | |
| 20 | 6000 | 250 | 996 | 0.220 | 54 | | |
| 30 | 6000 | 250 | 990 | 0.220 | 54 | | |
| 40 | 6000 | 250 | 985 | 0.220 | 54 | | |
| 50 | 6000 | 250 | 982 | 0.220 | 54 | | |
| 0 | 8000 | 250 | 720 | 0.218 | 40 | | |
| 10 | 8000 | 250 | 673 | 0.216 | 37 | | |
| 20 | 8000 | 250 | 662 | 0.215 | 37 | | |
| 30 | 8000 | 250 | 655 | 0.214 | 37 | | |
| 40 | 8000 | 250 | 651 | 0.214 | 37 | | |
| 50 | 8000 | 250 | 647 | 0.214 | 36 | | |
| 0 | 10000 | 250 | 392 | 0.204 | 23 | | |
| 10 | 10000 | 250 | 0.59 | 0.202 | 21 | | |
| 20 | 10000 | 250 | 352 | 0.201 | 21 | | |
| 30 | 10000 | 250 | 348 | 0.200 | 21 | | |
| 40 | 10000 | 250 | 344 | 0.200 | 21 | | |
| 50 | 10000 | 250 | 342 | 0.200 | 21 | | |

Figure 16

SPHERICAL PELLETS CONTAINING COMMON CLAY PARTICULATE MATERIAL USEFUL AS A PROPPANT IN HYDRAULIC FRACTURING OF OIL AND GAS WELLS

RELATED APPLICATION

This application claims the priority of U.S. Provisional Application No. 61/664,591 filed on Jun. 26, 2012 and entitled "SPHERICAL PELLETS CONTAINING COMMON CLAY PARTICULATE MATERIAL USEFUL AS A PROPPANT IN HYDRAULIC FRACTURING OF OIL AND GAS WELLS" and which is incorporated herein as if fully set forth.

FIELD OF THE INVENTION

This disclosure relates in general to the field of hydraulic fracturing, and more particularly to ceramic propping agents, or "proppants."

BACKGROUND OF THE INVENTION

Hydraulic fracturing, often referred to as "fracking" in the energy industry, is a stimulation technique utilized to increase the productivity of an oil and/or natural gas well.

The fracturing process involves injecting a fluid into rock formations at a high rate and pressure in order to widen existing openings in the rocks or create new cracks in the formation. Once the cracks are created, fluid containing a particulate material, often referred to as a propping agent or "proppant," is pumped into the newly created fractures to maintain the openings. This process allows for an easier and more efficient flow of hydrocarbons (e.g. oil and/or natural gas) through increased permeability in tight underground structures.

Hydraulic fracturing has been used with increasing frequency to improve the productivity of oil and/or natural gas wells in low permeability reservoirs. The list of raw materials previously used as proppants include: sand (the most common proppant), nut shells, aluminum and aluminum alloys, wood chips, crushed coke, granulated slag, pulverized coal, crushed rock, granules of metal such as steel, sintered bauxite, sintered alumina, refractories such as mullite, and glass beads.

As the technology associated with hydraulic fracturing has evolved and improved, those in the industry have recognized the benefit of manufacturing spherical shaped proppant bodies. Ceramic proppants in particular were manufactured with particulate material that was processed by a "dry" or "wet" manufacturing technique.

Ceramic proppants have been found to yield more consistent and efficient production than some of the more common and inexpensive proppants. Ceramic proppants have been shown to have more advantageous characteristics due to their increased strength and uniformity of size and shape. Ceramic proppants have not been utilized as commonly as others in the past because of certain limitations.

Common mineral particulates historically used in the manufacture of ceramic proppants are characterized by a high alumina content. This has caused difficulty in the manufacturing process, as many mineral particulate deposits are limited in supply and only available in certain geographical locations. The scarcity of raw materials has led to manufacturing facilities located far from the oil and/or natural gas wells on which they will be utilized, and therefore higher associated transportation costs of said proppants.

A ceramic proppant that is stronger and more efficient, with a more cost effective method of being produced, has been the desire of those in the oil and gas industry for years.

BRIEF SUMMARY OF THE INVENTION

The present disclosure relates to a ceramic propping agent, or "proppant."

For purposes of describing the following embodiments, the term "particulate ceramic" refers to the desired resulting composition for utilization in oil and/or natural gas wells (or for other hydrocarbon deposits) as a ceramic propping agent. The term "mineral particulate" refers to the raw materials from which a particular ceramic proppant was made. One embodiment of the desired propping agent is defined as a particulate ceramic made from raw materials which may comprise about: 10%-90% parts by weight of a naturally occurring mineral particulate, 30%-70% parts by weight aluminosilicate network modifier, 0.25%-20% parts by weight strength enhancer, and, typically, at least one part, typically less than 10% by weight, binder.

As seen in the following described embodiments, common clay may be combined with other materials to enhance the crush strength of the particulate ceramic. The "aluminosilicate network modifier" may be selected from various modifiers including, but not limited to, one or more of the following: kaolin, metakaolin, bauxite, bauxitic clays, aluminum oxide, and other metal oxides. Some embodiments of the particulate ceramic may contain from about 30%-70% aluminosilicate network modifier. In one embodiment of the present invention metakaolin serves as the aluminosilicate network modifier and nepheline syenite serves as a strength enhancer, as well as fluxing agent of 0.25%-20% by weight, in the particulate ceramic. The material particulate and aluminosilicate network modifier may be utilized in an un-calcined, partially calcined, or calcined form.

In one embodiment the common clay is ground and agglomerated with finely ground aluminosilicate network modifier, a strength enhancer, water and, in some embodiments, a binder. The binder may be chosen from, but not limited to, one or more of the following: cornstarch, polyvinyl alcohol ("PVA"), or cellulose gum ("CMC"). As a result of this process, the various components are formed into solid, spherical pellets of mesh sizes most desired by and suitable for their purpose, for example, use in the hydraulic fracturing of oil and/or natural gas wells. In some embodiments the "green body" pellets are then fired in a kiln, or otherwise heated at temperatures ranging from about 1200° C. to about 1800° C. for periods ranging from about 30 to about 60 minutes with the soak time at peak temperature ranging from about 15 to about 30 minutes.

One of the embodiments utilizes a Pennsylvanian age Strawn Group clay or "common red clay." This dominantly siliceous clay/shale has thin lenses and layers (<5 feet) of calcareous, very fine-grained sandstones and fossil-rich clays. Recent X-ray diffraction (XRD) analyses have identified quartz, illite, chlorite, wustite, and kaolinite within the clay deposit. In said embodiment, common red clay constitutes from 10%-90% by weight of the particulate ceramic.

Common clay is distinguished as clay having alumina content ranging from about 7% to less than about 25%, a silica content ranging from about 60% to less than about 90%, and a quartz content less than about 45%. Common clay is readily available in most markets and geographical areas. It has historically been used in the manufacture of ceramic bodies including: brick, tile, floor tile, pottery, and Portland cement.

In some embodiments the mineral particulate is ground to a particle size where 95% of the ground mineral particulate has a particle size of less than 45 microns, and in some embodiments the particle size is less than 10 microns. The mineral particulate may be un-calcined, partially calcined, or calcined. The ground mineral particulate is generally mixed and agglomerated with an aluminosilicate network modifier(s) ground, for example, to approximately equal particle size or less as the mineral particulate. The aluminosilicate network modifier may be selected from, but is not limited to, the group of kaolin, metakaolin, bauxite, bauxitic clays, perlite, fly ash, volcanic ash, and alumina oxide sources. The strength enhancer may be selected from, but is not limited to, the groups of nepheline materials, or metal oxides such as iron manganese, or dolomite. The mineral particulate and aluminosilicate network modifier(s) may be un-calcined, partially calcined, or calcined. In some embodiments, the common clay, aluminosilicate network modifier(s), and strength enhancer(s) are combined into spherical pellets. Various methods of pellet formation can be used, with one such method involving the use of an Eirich mixer.

The ground mineral particulate, aluminosilicate network modifier, and strength enhancer are generally mixed with small amounts of binder and water. Additional milled mineral particulate may generally then be added and mixing continues, forming spherical pellets. Dry powder may be continually added until the desired size of green pellets is reached. The green pellets are then dried to 1% moisture or less and screened to eliminate pellets larger or smaller than the desired mesh size range. In some embodiments, the screened green pellets are then sintered at about 1200° C. to about 1800° C. for about 30 to about 60 minutes in a rotary kiln, while in other embodiments different temperatures, different times and a different heating mechanism may be used. In some embodiments, the time of the soak at peak temperatures ranges from about 15 to about 30 minutes. This results in spherical ceramic pellets with specific gravity of about 2.30 to about 3.40 g/cc, depending upon the mineral particulate content. Any binder that adequately holds the unfired pellet together and does not adversely affect the strength of the fired pellet may be used, for example, PVA at 1 to 3% dry weight loadings. After firing, the particulate ceramic is generally suitable for use as a proppant.

In another embodiment the fired particulate ceramic is encapsulated in resin such that fines produced from the crushed particulate ceramic are contained within the phenolic or non-phenolic resin coated proppant so that the fines tend to be contained within the particle rather than released into the subterranean fractures created by hydraulic fracturing.

In other embodiments binders useful as raw materials in the disclosed subject matter can include, but are not limited to, one or more of the following: PVA, bentonite such as sodium bentonite, sodium silicate, cellulose gum, vegetable starches, and sodium lignosulphonate.

As a proppant, the embodiments of the inventive composition offer several advantages, including but not limited to: lower raw material costs than proppants manufactured from primarily bauxite, kaolin or kaolinitic clay, and montmorillonite-smectite clay; lower firing temperature in some product lines, and thus lower energy cost in manufacture, than sintered bauxite and proppants manufactured from bauxite, bauxitic clays, kaolin or kaolinitic clay, and montmorillonite-smectite clay; superior crush resistance to sand or resin coated sand; fracture conductivity which is superior to sand or resin coated sand; specific gravity which is lower than that of bauxite and nearly the same as sand; bulk density which is substantially lower than that of bauxite and lower than that of sand; lower transportation cost to the final user as common clay is available in most areas where hydraulic fracturing occurs and manufacturing facilities can be built in close proximity; and, better delivery logistics than currently available ceramic proppants because manufacturing plants can be built within trucking distance of final use, eliminating rail for transshipment to truck for final delivery logistics.

These and other aspects of the disclosed subject matter, as well as additional novel features, will be apparent from the description provided herein. The intent of this summary is not to be a comprehensive description of the subject matter, but rather to provide a short overview of some of the subject matter's functionality. Other systems, methods, features and advantages here provided will become apparent to one with skill in the art upon examination of the following FIGURES and detailed description. It is intended that all such additional systems, methods, features and advantages that are included within this description, be within the scope of the claims and any claims filed later.

BRIEF DESCRIPTIONS OF THE FIGURES

The novel features believed characteristic of the invention will be set forth in any claims appended hereto or that are filed later. The invention itself, however, as well as a preferred mode of use, further objectives, and advantages thereof, will best be understood by reference to the following detailed description of an illustrative embodiment when read in conjunction with the accompanying drawings, wherein:

Figure 1:
FIG. 1 is a 1×1 resolution depiction of an embodiment of the finished particulate ceramic with a mesh size ranging from −20/+40 of Example II.
Figure 2:
FIG. 2 is a 3×1 resolution depiction of an embodiment of the finished particulate ceramic with a mesh size ranging from −20/+40 of Example II.
Figure 3:
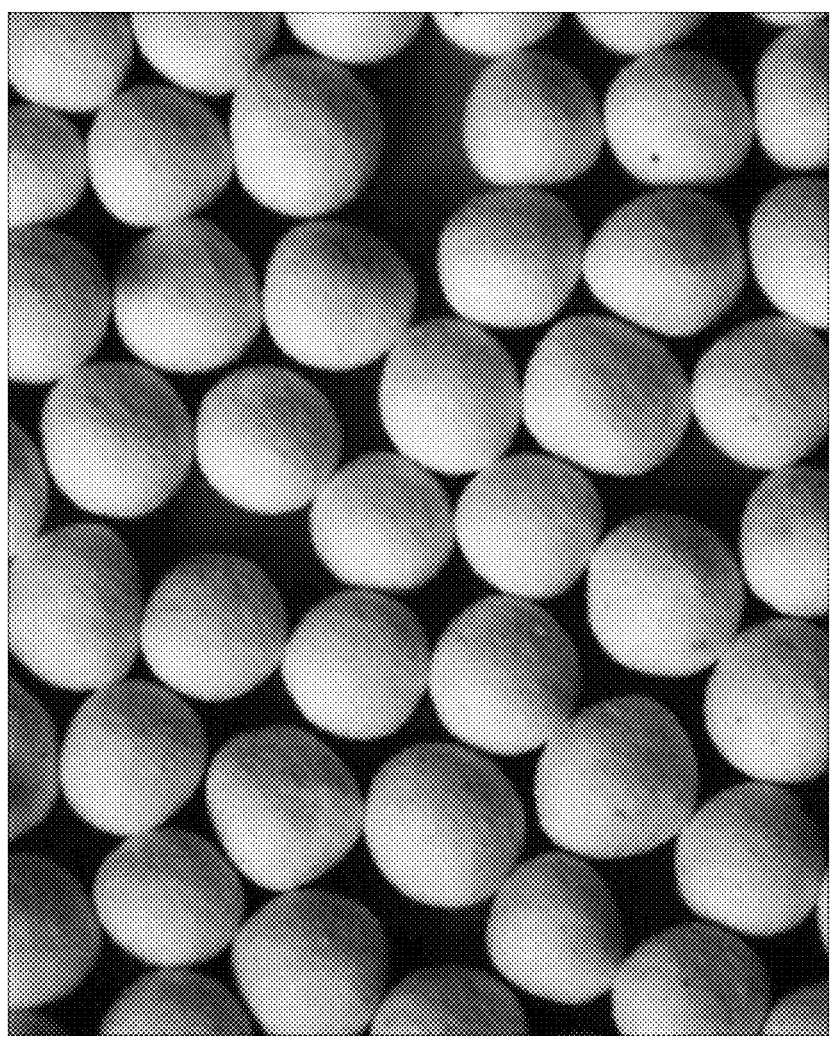
FIG. 3 is a 1×1 resolution depiction of an embodiment of the finished particulate ceramic with a mesh size ranging from −30/+50 of Example II.
Figure 4:
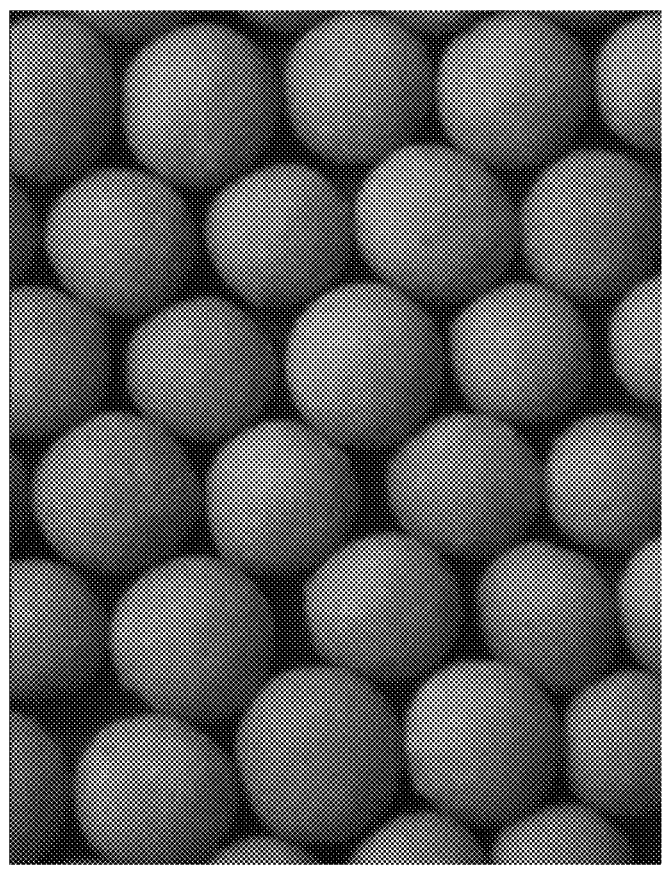
FIG. 4 is a 3×1 resolution depiction of an embodiment of the finished particulate ceramic with a mesh size ranging from −30/+50 of Example II.
Figure 5:
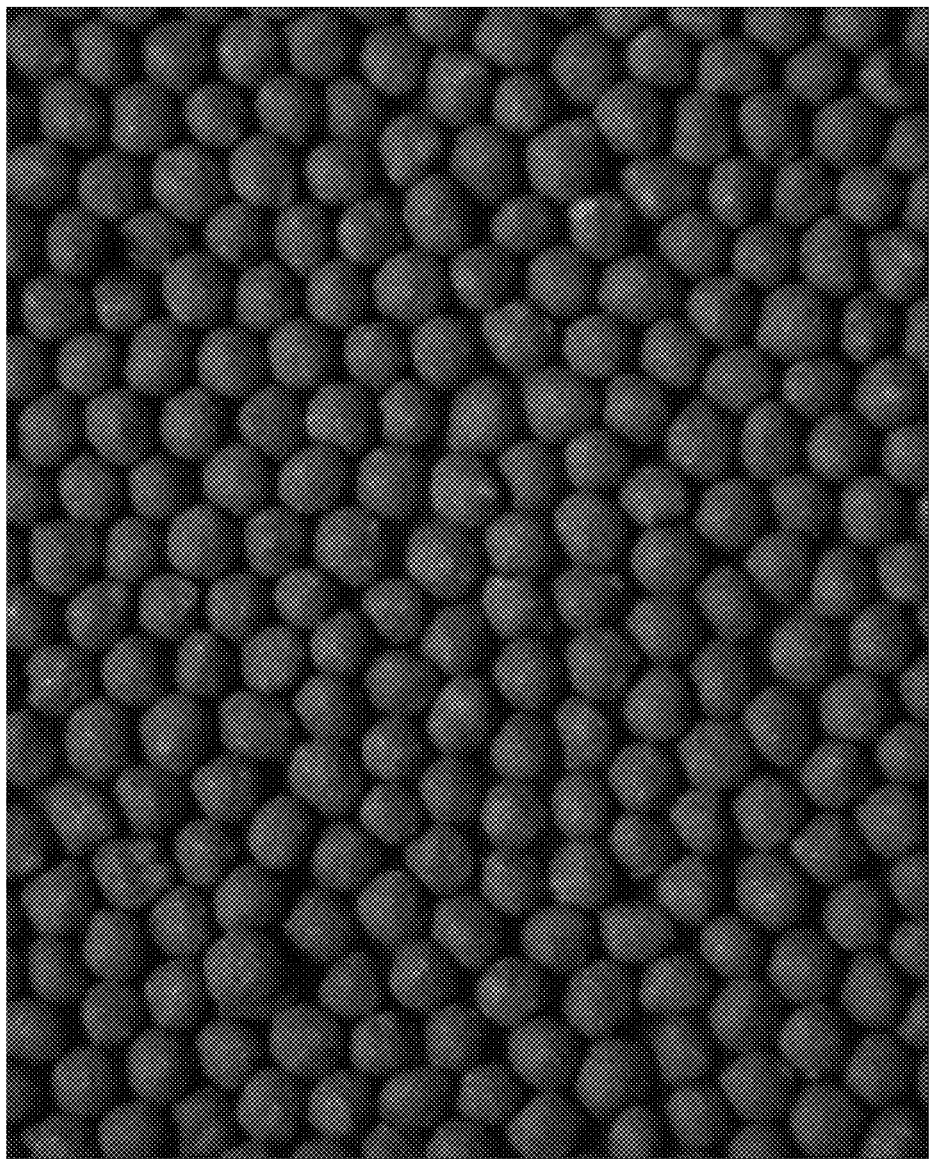
FIG. 5 is a 1×1 resolution depiction of an embodiment of the finished particulate ceramic with a mesh size ranging from −40/+80 of Example III.

FIG. 8 gives the weight percent of common clay used in Examples I-IV;

FIG. 9 gives the characteristics of the fired particulate ceramic for examples I-IV at a mesh range of −40/+70;

FIG. 10 gives the characteristics of the fired particulate ceramic for examples I-IV at a mesh range of −30/+50;

FIG. 11 gives the characteristics of the fired particulate ceramic for examples I-IV at a mesh range of −20/+40;

FIG. 12 gives the chemical composition of the mineral particulate, aluminosilicate network modifiers, and strength enhancers utilized to produce the particulate ceramics of Examples I-IV;

FIG. 13 gives the conductivity and permeability of the fired spheroids of Example II at a mesh range of −20/+40;

FIG. 14 gives the conductivity and permeability of the fired spheroids of Example II at a mesh range of −30/+50;

FIG. 15 gives the conductivity and permeability of the fired spheroids of Example II at a mesh range of −40/+70;

FIG. 16 gives the conductivity and permeability of the fired spheroids of Example III, in a mesh range of −40/+80.

DETAILED DESCRIPTION

While the invention has been described with respect to a limited number of embodiments, the specific features of one embodiment should not necessarily be attributed to other embodiments of the invention. No single embodiment is necessarily representative of all aspects of the inventions. Moreover, variations and modifications therefrom exist. For example, the invention described herein may comprise other components. Various additives may also be used to further enhance one or more properties. In some embodiments, the inventions are substantially free of any additive not specifically enumerated herein. Some embodiments of the invention described herein consist of or consist essentially of the enumerated components. In addition, some embodiments of the methods described herein consist of or consist essentially of the enumerated steps.

The ceramic propping agent disclosed may be comprised of plastic clays and shales not suitable for use in refractory admixtures.

The particulate ceramics of the present disclosure may be made by a process comprising several steps described herein. In a first step, mineral particulate material, aluminosilicate network modifier(s), binder, strength enhancer(s), and water are mixed and pelletized in order to form spheroid particles. An exemplary mineral particulate that may be utilized is a non-kaolin, non-kaolinitic, non-smectite, non-montmorillonite-smectite common illitic structural clay such as that found in the Strawn Formation from the Pennsylvania Shale era mined from a site in Brown County, Tex. Clays are generally classified into the following groups: kaolin group, which includes the minerals kaolinite, dickite, and nacrite; smectite group, which includes dioctahedral smectites such as montmorillonite and nontronite and triocatahedral smectites such as saponite; illite group, which includes the clay micas where illite is the common mineral; chlorite group; and, mixed-clay, which consists of combinations of the denoted groups. Clays are commonly referred to as 1:1 or 2:1. Clays are fundamentally built of tetrahedral sheets and octahedral sheets. A 1:1 clay would consist of one tetrahedral sheet and one octahedral sheet, and examples would include kaolinite and serpentine. A 2:1 clay consists of an octahedral sheet sandwiched between two tetrahedral sheets, and examples are illite, smectite, attapulgite, and chlorite. Common clays are 1:1 or 2:1 clays that are naturally occurring, fine-grained material composed primarily of hydrous aluminum silicates, often with significant impurities that distinguish them from substantially pure clay minerals or mixtures of substantially pure clay minerals. The term common clay encompasses a wide variety of clay types, including fine-grained rocks such as shale. Common clays suitable for the present invention include all 1:1 or 2:1 clays that are not identified as substantially pure kaolins or smectites. Other common clay types suitable for the present invention include Redart clay, which is mined in Ohio, Newman Red Clay and Lincoln Fire Clay, both mined in California.

In some embodiments, the mineral particulate material, aluminosilicate network modifier, and strength enhancers are ground prior to mixing into the same approximate particle size. Using all materials of approximately the same particle size allows for the distribution of the alumina content evenly throughout the particulate ceramic.

In some embodiments, an agglomeration process may be utilized where the particle size of the particulate material is coarser than the other materials in the formula and forms a core or seed. The other materials with higher alumina content are ground to a finer particle size and agglomerate to the seed forming the spheroid, with the result being that higher alumina content within the spheroid is found at the outer portions and surface of the particulate ceramic so formed.

Selecting the type of mixer which may be used in the first process step is important since it has several important functions. The mixer must process the mineral particulate material, aluminosilicate network modifier(s), and strength enhancer(s) into unfired spheroids having a high Krumbein roundness. The mixer should do this at a relatively high yield of particles in the range of 0.84 to 0.177 millimeters in largest dimension (20-80 mesh). Several types of mixing apparatuses may be applied such as balling pans or disk agglomerators found in the mining industry.

High energy mix pelletizers are well suited to the embodiments described herein. Two examples of such machines that may be utilized are the Littleford® (a registered trademark of Littleford Day) mixer and the Eirich® (a registered trademark of MASCHINENFABRIK GUSTAV EIRICH GMBH & CO. KG) Machine. These mixers comprise a rotatable cylindrical container, the central axis of which is at an angle to the horizontal, one or more deflector plates, and at least one rotatable impacting impeller usually located below the apex of the path of rotation of the cylindrical container. The rotatable impacting impeller engages the material being mixed and may rotate at a higher angular velocity than the rotatable cylindrical container itself.

The basic steps that may be utilized in making the spheroids in a high energy mix pelletizer include, but are not limited to: (1) mixing the dry powders of the mineral particulate, aluminosilicate network modifier, strength enhancer(s), and binder, with all being ground to the same approximate particle size, at high speed; (2) nucleation at which time water is added to the region of the mix pelletizer near the impacting impeller to be dispersed into droplets and aid in the formation of spherical pellets of the particulate ceramic; (3) growth of the spheroids in the manner of a snow ball with the powder agglomerating on the tiny grains during which time the impacting impeller rotates at a slower speed than it did during the nucleation step; (4) the addition of a dry mix of the formula to adhere to the surface of the agglomerated mixture, resulting in more spherical pellets; and (5) polishing or smoothing the surfaces of the spheroids by turning off the impacting impeller and allowing the cylindrical container to rotate. This last operation is similar to a balling pan.

In prior known processes, the mixing process has included a "seed-shell" process where the particulate mineral is ground to a coarser particle size than the strength enhancer and serves as a seed on which the finer strength enhancer agglomerates, building the spheroid with the result that the mineral particulate is in the interior of the spheroid coated with the strength enhancer to the surface of the pellets. In contrast, in the disclosed subject matter, all elements of the formulation (mineral particulate, strength enhancer, and binder) may be ground and agglomerated such that all elements of the formula are evenly dispersed throughout the pellets.

The amount of dry binder generally comprises about 0.25% by weight of the dry materials fed to the mix pelletizer and the amount of liquid binder may range from about 1 to about 3% depending on the formulated composition of the desired mix.

The wet spheroids, or prill, are discharged from the mix pelletizer and dried at a temperature of about 120° C. to about 180° C. The dried spheroids may be screened to obtain a mesh size of 20/80 mesh (0.84 to 0.177 mm) for further processing. The particle size range selected is actually larger than the desired end product because of the shrinkage of the spheroids during firing.

The next step is to feed, typically by a vibratory feeder, the spheroids to a rotary kiln. If the spheroids agglomerate together or stick to the kiln walls prior to reaching vitrification temperature, then additional parting agent may be required. Thus, the function of the parting agent is to prevent the spheroids from agglomerating or sticking to the kiln walls.

The vitrification step, also called firing, may be done statically, but a rotary kiln is a better suited apparatus for this step. The residence time of the spheroids in the kiln is dependent upon several parameters: kiln length, diameter, angle, rotational speed, feed rate to the kiln, temperature within the kiln, particle size of the spheroids, and shape of the particles. Residence time is adjusted to achieve the desired properties with each specific formulation for a given end use. A typical residence time in the kiln can be about 30 minutes or more. As residence time becomes shorter, the process is more difficult to control because some spheroids may not be subjected to the correct thermal history and thus not attain the desired strength. A shorter residence time can also have the effect of lowering the density of the final product, but at the expense of crush strength. There is no particular advantage to residence times that are longer than the optimum. However, a given particle can be made at lower temperatures if longer residence times are used. The time the product is exposed to peak temperature during firing can range from about 15 to about 30 minutes.

Typically, the kiln temperature is initially set low and then raised in stages at a given residence time until the maximum crush strength is attained in the end product. This corresponds to the optimum firing condition.

The product from the kiln is screened to obtain the desired particulate ceramic size fraction that may be about 20/80 mesh (0.84 to 0.177 mm). Before, during, or after this screening step the spheroids may be subject to vigorous agitation by air or some other agitation method in order to remove dust from their surfaces. This is known as the "deducting" step.

The alumina gradient within the spheroids may be achieved in several ways. The particulate mineral material has an alumina content by weight ranging from about 7% to less than 25%. High alumina content aluminosilicate network modifiers are added to achieve a blended alumina content sufficient to achieve the desired level of crush strength. Depending upon desired crush strength the weight percent of the particulate mineral may range from 10% to 90%, with a lower weight percent of the mineral particulate achieving higher crush strength at the trade off of increased weight (measured in specific gravity). The weight percent of the aluminosilicate network modifier may range from 30% to 70%. The weight percent of the strength enhancer may range from 0.5% to 20% and will have an impact of specific gravity, strength, and firing temperature.

Methods for evaluating the properties of proppants may be found in American Petroleum Institute Publications such as: API RP 19C, Recommended Practice for Measurement of Proppants in Hydraulic Fracturing and Gravel-packing Operation, First Edition as well as the internal standard of ISO 13503-2:2006/Amd.1:2009(E), which are incorporated herein by reference in their entirety. Two important parameters for evaluating proppants are crush strength, or crush resistance, and fracture conductivity. Crush strength indicates the extent to which the proppant material will actually perform its function of propping up the rock formation, standing as a pillar within the fracture, and resisting the crushing pressure of the formation. Crush strength is measured by placing a sample of proppant material into the 1" to 2" internal diameter die cavity of a test apparatus. The test volume of the proppant sample is equivalent to the volume occupied by 4 pounds/ft.sup.2 (1.95 g./cm.sup.2) of the desired mesh size proppant in the test cell. A steel plunger or piston applies pressure to the ceramic inside the cavity at a rate of 2000 lbs per minute to achieve the test pressure (e.g. 5,000 psi, 7500 psi, 10000 psi, 12500 psi or 15000 psi), and 2 minutes at test pressure after which the pressure is released. The sample is screened between 20, 40 and 80 mesh screens for 10 minutes on a Ro-Tap® (a registered trademark of W.S. Tyler) screen vibrator, and the percentage of fines less than the smallest mesh size is recorded. It is desired to minimize the weight percent fines produced in the crush strength test.

Fracture conductivity is a measure of the flow rate of fluid which can be conducted through a fracture under given conditions. It is measured in millidarcy-feet (md-ft) at various applied pressures. Both crush strength and fracture conductivity values typically decrease with increasing applied pressure. However, the relationship of this decrease with pressure varies significantly with the type of proppant used. Directly related to conductivity, permeability measures the ability of fluids to flow through rock or other porous media, such as a proppant pack in a hydraulically fractured oil or gas well. Permeability is measured in Darcies with each Darcy representing 1,000 millidarcies. Tests for proppant conductivity and permeability can be measured in a conductivity cell in accordance with ISO 13503-2:2006/Amd.1:2009 (E).

Figure 6:
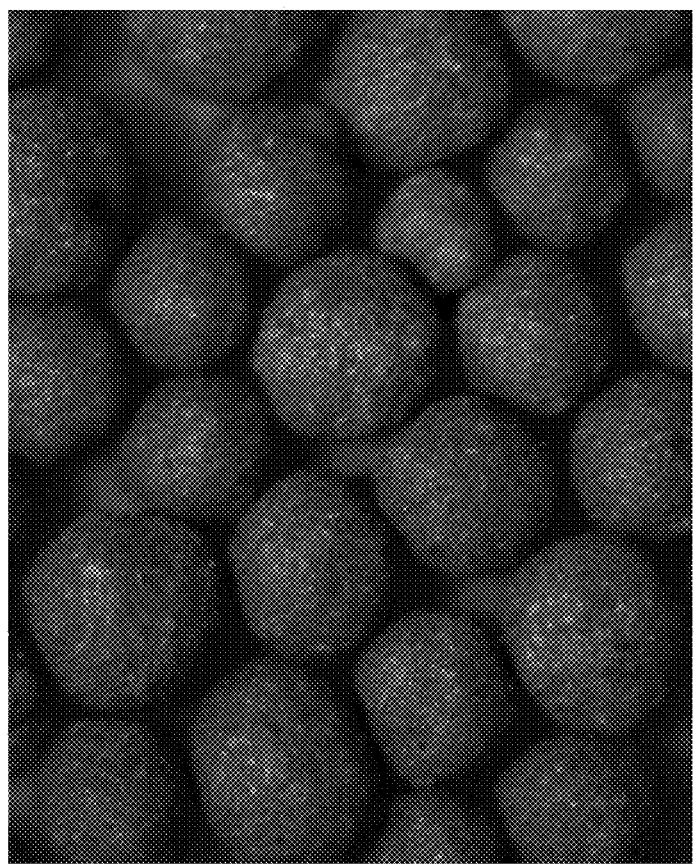
FIG. 6 is a 3×1 resolution depiction of an embodiment of the finished particulate ceramic with a mesh size ranging from −40/+80 of Example III.
Figure 7:
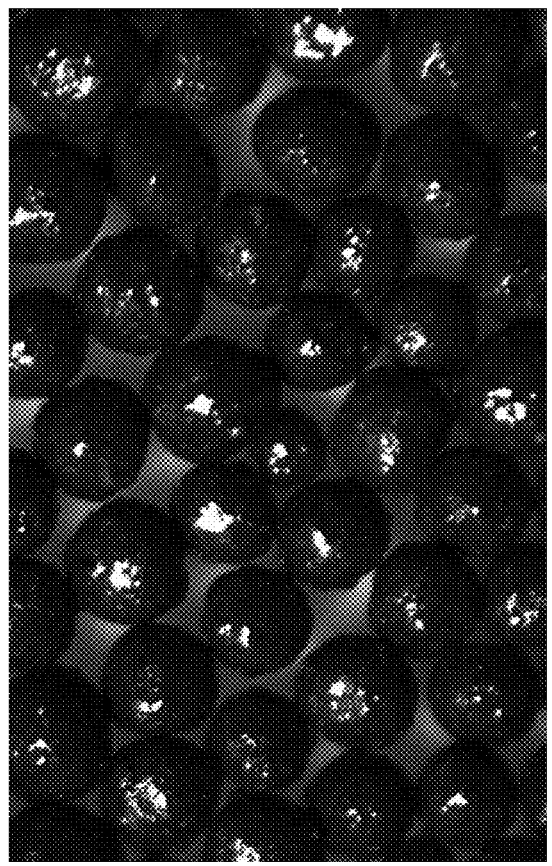
FIG. 7 is a 1×1 resolution depiction of an embodiment of the finished particulate ceramic with a mesh size ranging from −40/+80 of a resin coated version of Example III.

Bulk density can be measured in accordance with ISO 13503-2:2006/Amd.1:2009(E) by using the mentioned apparatus in FIG. 6 of the ISO standard.

An additional parameter of importance is the weight by volume of the proppant expressed in terms of specific gravity. In the hydraulic fracturing process the proppant is transported through the well bore to the fractures in fluid or gel solution. Lower weights allow for better conductivity and transportability with lower pumping pressures and less viscous fracking fluid solution. Assuming consistent crush strength and conductivity, a lighter weight, lower specific gravity proppant is desired.

The particulate ceramic examples in FIGS. 1-7 are grouped into mesh size samples. In practice users specify and purchase specified size groupings for their applications. Screens are used such that all particulate ceramic with diameters less than the first stated mesh number fall through the screen and are not retained in the size grouping. Particulate ceramic with diameters larger than the second stated mesh number are screened out and do not enter the mesh size grouping. By way of example mesh size groupings are stated as 20/40 or −20/+40. In each instance particulate ceramic in this size grouping would have a diameter of at least 20 mesh and no greater than 40 mesh. The correlative diameters of particulate ceramic expressed in mesh sizes is as follows:

| U.S. MESH SIZE | MILLIMETERS | INCHES |
|---|---|---|
| 20 | .853 | .0331 |
| 40 | .422 | .0165 |
| 50 | .297 | .0117 |
| 70 | .211 | .0083 |
| 80 | .178 | .0070 |

The disclosed subject matter will be further clarified by a consideration of the following examples, which are intended to be purely exemplary.

EXAMPLES

EXAMPLES I-IV were prepared using a similar process. As such, only Example III will be discussed below:

For Example III, a dry ceramic mix of:
4,400 grams of common red clay obtained from Brown County, Tex. deposit ("BCH"); and
1,100 grams of three aluminosilicate network modifiers
was blended for two minutes in the pan of a mixer/granulator (may use Eirich Machines, Inc., Model RV02) with the cylindrical container rotating at about 30 hertz. The pan and rotor were engaged with a fast pan speed and a rotor speed of 40 hertz. Pan rotation was clockwise and rotor rotation was counter-clockwise. The impacting rotor impeller had vanes or deflecting blades of two sizes, 125 and 185 mm long. Then a mixture of 700 grams of water and binder, which may be selected from among cornstarch, CMC, or PVA, was added over a period of about one minute. Speed was increased immediately after the water and binder were added to 70 hertz. At 4 minutes, pan was reduced to slow speed and 250 grams of dry retained mixed material was added. At 5 minutes total mixing time, the rotor speed was decreased to 50 hertz and retained mixed material was added. At 6 minutes total mixing time, the rotor speed was decreased to 40 hertz and retained mixed material was added. At 7 minutes total mixing time, the rotor speed was decreased to 30 hertz and retained mixed material was added. At 8 minutes, rotor speed was reduced to 20 Hz and mixed for a time period of 1 to 5 mins, dependent on desired size and spherical shape. Once desired results were achieved, the mixing unit was stopped and the finished batch of particulate ceramic was removed.

FIG. 8 gives the weight percent of common clay used in each formulation and FIGS. 9-11 give the characteristics of the fired particulate ceramic for examples I-IV. Bulk density may be measured in accordance with ISO 13503-2:2006/Amd.1:2009(E) by using the mentioned apparatus in FIG. 6 of the ISO standard.

Alternatively, bulk density can be measured by pouring the material at a constant flow rate into a container of known volume, leveling off the top surface with a straight edge and recording the weight.

The wet spheroids were removed from the mix pelletizer, placed into flat trays, and dried in an electric dryer, not equipped with a circulation fan, at a set point temperature of 250° F. until a moisture level of <1% was reached. Moisture was measured by a Moisture Analyzer such as the ML-50 manufactured by A&D. The dried spheroids were screened using U.S. standard mesh full height screens manufactured by Hogentogler and W.S. Tyler. Screening was mechanically accomplished by using a W.S. Tyler Ro-Tap® (a registered trademark of W. S. TYLER COMPANY CORPORATION) Model RX-29 for 5 minutes. The large mesh opening screen was stacked on top of the small mesh opening screen with a catch pan in place on the bottom of the stack to obtain −40/+80 mesh (0.420-0.177 mm) fractions (note: what remain on the 40 mesh screen and catch pan are considered waste in this particular example).

The particulate ceramic was placed into crucibles of fireclay/alumina composition. The screen material was weighed prior to placement in the crucible. Filled crucibles were weighed prior to firing to allow for calculation of weight loss during firing. The crucibles were placed in a furnace for firing. Firing was done in an electrically heated furnace using either a Skutt Kiln model KM818-3 or Sentro Tech box furnace Model ST-V600C-666. The machine is operated at atmospheric pressure in air. The heating rate and peak temperature hold was controlled by a built in microprocessor controller with input from a standard thermocouple supplied by the furnace manufacturer. To confirm the amount of heat work (time and temperature relationship) a temperature uniformity tab, TempTAB, suitable for the planned peak temperature and manufactured by Orton Ceramic Foundation was placed on the top surface of one crucible, taking care not to embed the tab such that material penetrates the center hole of the tab. The firing temperature curve for this formulation was characterized by: start-temperature-ambient, heat to 2200° F. at 400 to 1000° F. per hour, hold peak temperature for 0.25 to 0.75 hours, and power off kiln and allow to cool in room temperature at an approximate cooling rate of 145° F. per hour. After the firing cycle was complete and samples had cooled to a temperature to allow handling, the crucibles were then removed from the kiln. The Temp TAB was removed, taking care to return to the crucible any material that adhered to the tab. The Temp TAB was measured with a micrometer. An equivalent firing temperature was obtained by using an equivalency chart provided by the Orton Ceramic Foundation. Comparison of TempTAB results to previous firing confirmed ongoing consistency of multiple firings and the accuracy of the firing procedure. Crucibles were weighed and loss on ignition was calculated by the formula: weight of material before firing less weight of material after firing divided by weight of material before firing.

Fired material was removed from the crucible and prepared for screening to desired size. Screen sizes depend on the intended purpose of the proppant. Three size range groupings were used in this example:

−40 mesh+80 mesh—particulate ceramic diameters ranging from 0.177 to 0.420 MM

−20 mesh+40 mesh—particulate ceramic diameters ranging from 0.420 to 0.840 MM

−30 mesh+50 mesh—particulate ceramic diameters ranging from 0.297 to 0.590 MM

The screening procedure is identical in all cases. The larger mesh screen was placed on top of the smaller mesh screen with a pan below the stack. The assembly is placed in a Ro-Tap® machine and is operated for 5 minutes. Material was retained on the smaller mesh screen and was removed by hand for further testing.

Screened material was tested for apparent specific gravity and crush strength. There were five different force levels used in testing: 5,000 lbs, 7,500 lbs, 10,000 lbs, 12,500 lbs, and, 15,000 lbs. The test procedures are identical in all cases and vary only in the load placed on the sample.

The equipment used for testing crush strength is a steel cylinder with piston of 1" to 2" in diameter, dependent on the volume of material for testing. The piston is free floating within the cylinder and the cylinder has a removable base such that material may be placed inside the cylinder and force applied to the piston, creating stress and a crushing force to the material. The force is applied with a Carver Industries Model C bench top press equipped with force gauge calibrated in 200 lb increments. Force is applied with a manual hydraulic jack. The proper testing method is also followed using the ISO 13503-2:2006/Amd.1:2009(E) standard for comparable results.

A sample of the fired material of 20 grams was weighed out and measured on an analytical balance with 0.01 grams of accuracy. This procedure was repeated two additional times to create 3 samples for measurement and averaging. The measured sample was carefully poured into the die with a 1 inch piston so that the material surface in the cylinder was as level as possible. The piston was inserted in the cylinder and lowered until contact with the material was made. The piston was rotated 180 degrees without applying force to the sample or disrupting the crush cell die set. The die set was then placed in the center of the press. Without making contact, the lower platen of the press was raised by operating the lever jack as close to the die as possible without contacting the piston. The lever jack was operated until the test force level was achieved. The pressure of the test force level was maintained for 2 minutes at which point the pressure was released. The die cylinder was removed and all contents were poured onto a screen mesh corresponding to the bottom range of the proppant distribution being tested. By way of example, if a 40/80 mesh proppant is being tested, a 80 mesh screen is used. A brush was used to gently remove any remaining sample that was left in the cylinder. Using a Ro-Tap® machine, the sample was sieved for 10 minutes. The material passing through the designated mesh screen was weighed and compared to the weight of the sample before stress was applied, thus calculating the percentage amount by weight of crushed fines that passed through the mesh screen. The test is repeated with the two remaining samples and averaged for reporting.

Apparent specific gravity was calculated using the procedures subsequently described. A 10 ml pycnometer with a perforated stem (item #330403889641 obtained from Avogadro's Lab Supply, Inc.) was calibrated by weighing the clean, dry, empty flask, including the stem stopper, using an electronic scale capable of 0.01 gram precision. The WF (weight of flask) was calculated. The flask was filled with deionized water to the halfway point of the pycnometer stem. This was done without a stopper in place. The stopper was inserted into the pycnometer, allowing water to be discharged from the opening of the stopper, thus providing a constant volume of water for future testing. The entire assembly of water and pycnometer was weighed and the weight recorded. The dry pycnometer weight was subtracted from the assembly weight and recorded. The difference in weight was calculated and represents the weight of the liquid (WL). Three ml of dry sample material was measured using a 10 ml graduated cylinder. The material was weighed and the weight recorded. This represents the solid weight of material whose specific gravity is to be determined (WS). The 3 ml of dry material was put into an empty pycnometer. The pycnometer was filled approximately halfway up the stem of the pycnometer. Air bubbles were removed by gently tapping and rotating the pycnometer while holding it at an approximate angle of 45 degrees. The pycnometer was set upright on a flat surface and the stopper was inserted, ejecting water from the opening of the stopper. The exterior of the pycnometer was dried of any excess water and the absence of any bubbles was confirmed. The assembly consisting of the pycnometer, 3 ml of material, and deionized water was weighed and the weight recorded (WT).

The specific gravity of the material was calculated using the formula: WT−WL−WS−WF=Weight of Water Displaced (WD). WD is a negative number. The following calculation was performed using the absolute value without regard to sign: WS/WD=Apparent Specific Gravity. Deionized water has a specific gravity of 1.0 gram/ml (specific gravity=1). The method for apparent specific gravity is also followed using the ISO 135032:2006/Amd.1:2009(E) standard for comparable results.

In the current example the preferred mesh size of the sample proppant was −40 mesh+80 mesh, the specific gravity of the fired sample was 2.55, and the percentage of fines created at the noted crush pressures were as follows:
5,000 psi—0.7%
7,500 psi—2.0%
10,000 psi—3.9%

The same procedures as described above were used in the preparation and evaluation of all Examples. The dry weight material composition percentages and chemistry of the particulate ceramics of examples I-IV are given in FIG. 8. The properties of the fired spheroids of Examples I-IV, specified by mesh size range, are given in FIGS. 9-11. The chemical composition of the mineral particulate, aluminosilicate network modifiers, and strength enhancers utilized to produce the particulate ceramics of Examples I-IV are given in FIG. 12. The conductivity and permeability of the fired spheroids of Example II, specified by mesh size range, are given in FIG. 13-15. The conductivity and permeability of the fired spheroids of Example III, in a mesh range of −40/+80, are given in FIG. 16.

In addition to the above described embodiments, those skilled in the art will appreciate that this disclosure has application in a variety of arts and situations and this disclosure is intended to include the same.

What is claimed is:
1. A ceramic propping agent comprising:
   a plastic clay comprising a plurality of layers having a thickness of five feet or less, wherein the plastic clay further comprises:
      from 7% to 25% alumina by weight,
      from 60% to 90% silica by weight, and
      45% or less quartz by weight;
   an aluminosilicate network modifier selected from the group consisting of: kaolin, metakaolin, bauxite, bauxitic clays, aluminum oxide, metal oxides, or combinations thereof;
   a strength enhancing and flux agent comprising nepheline materials, wherein the nepheline materials comprise from 0.1 percent to 5 percent iron oxide by weight; and
   a binder selected from the group consisting of: cornstarch, polyvinyl alcohol, cellulose gum, bentonite, sodium silicate, vegetable starches, sodium lignosulphonate, and combinations thereof,
   wherein said plastic clay comprises from 38% to 90% of the ceramic propping agent by weight, wherein said aluminosilicate network modifier comprises from 30% to 70% of the ceramic propping agent by weight, wherein said strength enhancing and flux agent comprises from 0.25% to 20% of the ceramic propping agent by weight, and wherein said binder comprises 10% or less of the ceramic propping agent by weight.

2. The ceramic propping agent of claim 1, wherein said plastic clay comprises a clay that is not part of the following clays:
   a kaolin group;
   a smectite group;
   a montmorillonite-smectite group; or
   chlorite group.

3. The ceramic propping agent of claim 1, wherein said aluminosilicate network modifier, said plastic clay, or combinations thereof is un-calcined, partially calcined, or calcined in form.

4. The ceramic propping agent of claim 1, wherein said plastic clay comprises 38-80% of said ceramic propping agent by weight.

5. The ceramic propping agent of claim 4, wherein said plastic clay comprises 38-56% of said ceramic propping agent by weight.

6. The ceramic propping agent of claim 4, wherein said plastic clay comprises 56-80% of said ceramic propping agent by weight.

7. The ceramic propping agent of claim 1, wherein the plastic clay and the aluminosilicate network modifier comprise intermixed particles.

8. The ceramic propping agent of claim 7, wherein the intermixed particles comprise a size less than or equal to 45 microns.

9. The ceramic propping agent of claim 8, wherein the intermixed particles comprise a size less than or equal to 10 microns.

10. The ceramic propping agent of claim 7, wherein particles of the plastic clay and particles of the aluminosilicate network modifier comprise a same approximate particle size.

11. The ceramic propping agent of claim 1, further comprising a resin coating adapted to encapsulate particles of the ceramic propping agent.

12. The ceramic propping agent of claim 1, further comprising a shale of which said plastic clay is a component thereof.

13. A ceramic propping agent comprising:
a plastic clay comprising a plurality of layers having a thickness of five feet or less, wherein the plastic clay further comprises:
from 7% to 25% alumina by weight,
from 60% to 90% silica by weight, and
45% or less quartz by weight;
an aluminosilicate network modifier selected from the group consisting of: kaolin, metakaolin, bauxite, bauxitic clays, aluminum oxide, metal oxides, or combinations thereof;
a strength enhancing and flux agent comprising nepheline materials comprising from 0.1 percent to 5 percent iron oxide by weight; and
a binder selected from the group consisting of: cornstarch, polyvinyl alcohol, cellulose gum, bentonite, sodium silicate, vegetable starches, sodium lignosulphonate, and combinations thereof,
wherein said plastic clay comprises from 38% to 90% of the ceramic propping agent by weight.

14. A ceramic propping agent comprising:
a plastic clay comprising a plurality of layers having a thickness of five feet or less,
wherein the plastic clay further comprises:
from 7% to 25% alumina by weight,
from 60% to 90% silica by weight, and
45% or less quartz by weight;
an aluminosilicate network modifier selected from the group consisting of: kaolin, metakaolin, bauxite, bauxitic clays, aluminum oxide, metal oxides, or combinations thereof;
a strength enhancing and flux agent comprising nepheline materials, metal oxides, or combinations thereof; and
a binder selected from the group consisting of: cornstarch, polyvinyl alcohol, cellulose gum, bentonite, sodium silicate, vegetable starches, sodium lignosulphonate, and combinations thereof,
wherein said plastic clay comprises from 38% to 90% of the ceramic propping agent by weight, and
wherein the ceramic propping agent further comprises a resin coating adapted to encapsulate particles of the ceramic propping agent.

* * * * *